N. W. STORER.
SYSTEM OF CONTROL.
APPLICATION FILED APR. 4, 1914. RENEWED JUNE 19, 1917.
1,245,396.
Patented Nov. 6, 1917.
2 SHEETS—SHEET 1.
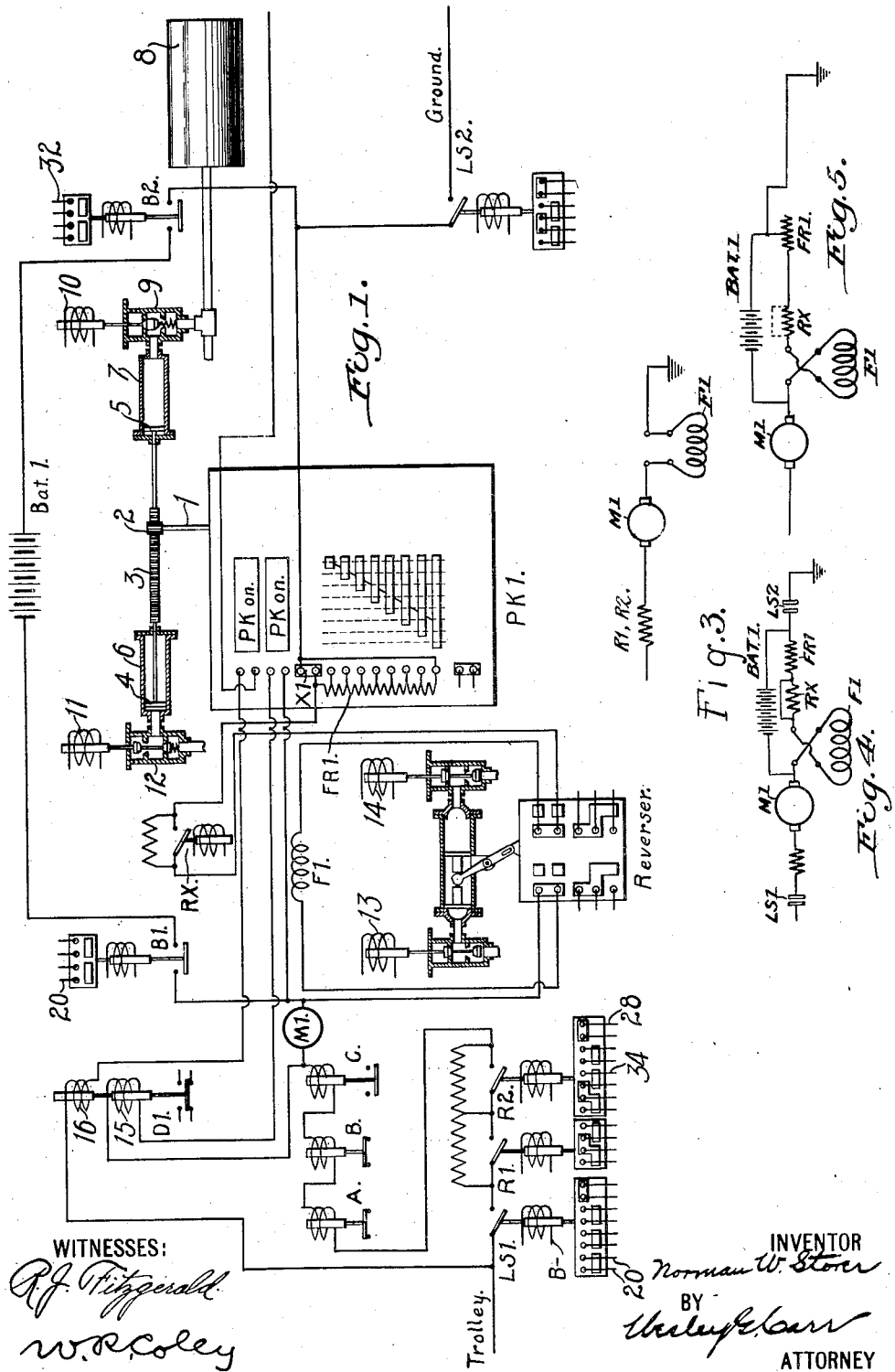
WITNESSES:
INVENTOR
Norman W. Storer
BY
Wesley G. Carr
ATTORNEY

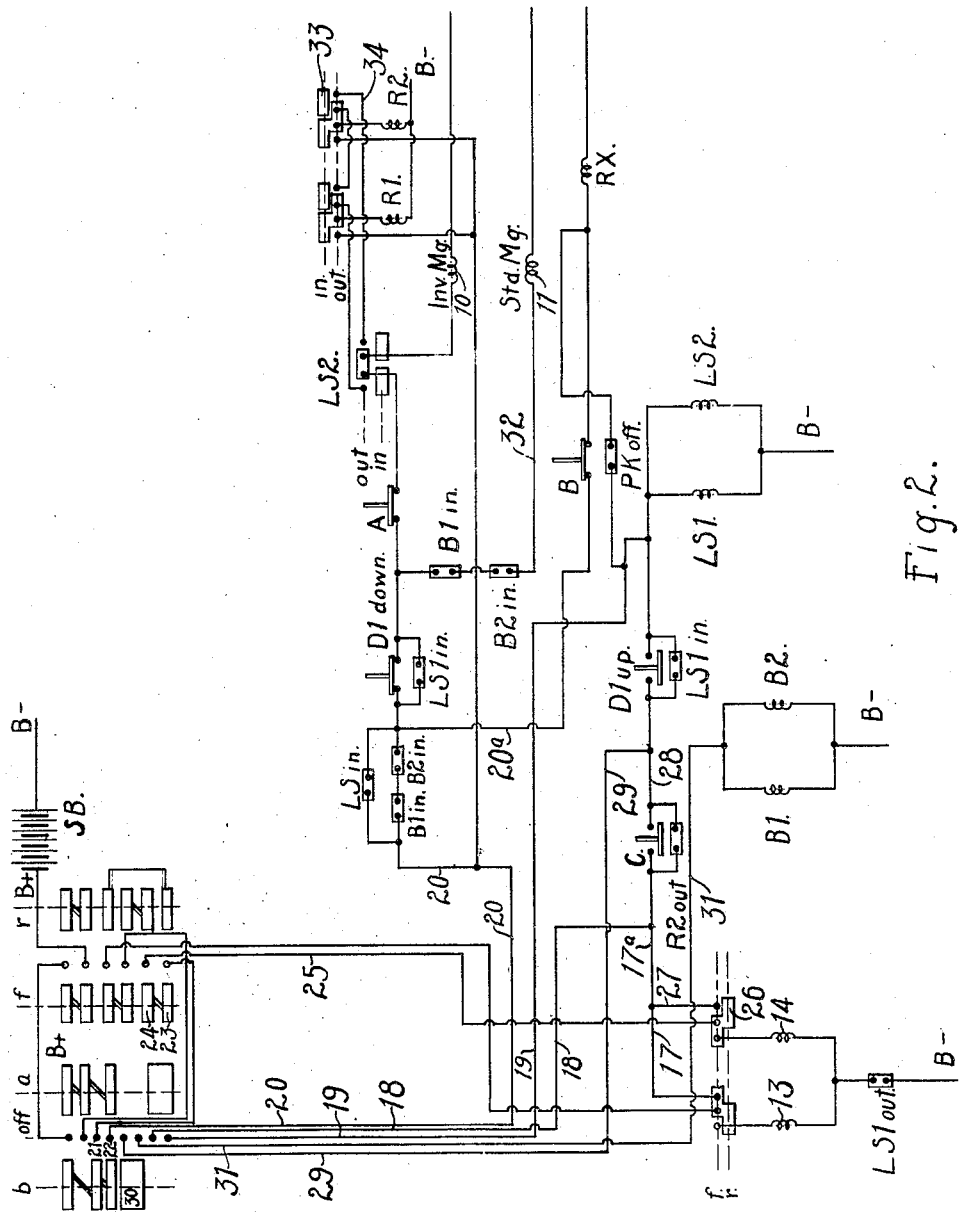

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,245,396.          Specification of Letters Patent.      Patented Nov. 6, 1917.

Application filed April 4, 1914, Serial No. 829,439. Renewed June 19, 1917. Serial No. 175,709.

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of electric motor control, and it has special reference to such systems as are adapted for use in electric railway service.

The object of my invention is to provide an automatic control system of the regenerative type which shall embody reliable and effective means for automatically maintaining a substantially constant dynamo current during the regenerating period.

In a more limited aspect, the object of my invention is to provide a single and inexpensive addition to the equipment of certain prior control systems of this general class, whereby the above-mentioned maintenance of constant regenerated current is readily secured.

While my invention is particularly adapted for the control of railway vehicles, it is not limited to any class of service and may be utilized in the control of automobiles and other road vehicles or in the control of cranes, hoists and other electrically operated devices.

In order to adapt the system of control for this service and to secure a maximum braking effort without injuring the electric motors or the other apparatus with which the vehicle is equipped, I have provided automatic means, in the form of a differential relay switch, for automatically connecting a propelling motor to the supply circuit when the electromotive force generated at its terminals bears a predetermined relation to the voltage of the power supply circuit.

I also provide improved means for automatically regulating the field excitation of the motor during the period when it is acting as a generator, whereby a substantially constant braking current is delivered to the supply circuit.

The improved means referred to comprises the combination with a field-regulating resistance that is automatically variable in accordance with the value of regenerated current, such as is described in my co-pending application, Serial No. 724,068, filed October 5, 1912, of a regulating resistor disposed in the local circuit comprising a battery, the motor field magnet winding and the field regulating resistance. The resistor is provided with a short-circuiting switch, the actuating coil for which is connected in circuit with a movable bridging contact member of a high-current limit switch, the resistor thus being short-circuited when the regenerated current falls below a predetermined value, and being placed in circuit when the current rises above a second predetermined value. By means of the above-mentioned combination, the regenerated current is maintained more nearly constant than has been the case heretofore. In practice, it is found that the short-circuiting switch of the resistor referred to, flutters open and closed in a manner similar to the regulating contact members of the well-known Tirrill regulator, thereby securing to the control system a degree of automatic regulation of regenerated current that has not been approached in the prior art. Oscillograph records of braking current that were taken both with and without this "Tirrill regulator switch" in circuit, show a much smoother and flatter curve when the switch and its resistor are employed than is the case when they are not used.

In addition to the foregoing, I so interlock the various control switches and apparatus of the system as to permit of normal motor operation in accelerating the vehicle by adjusting the master controller in one direction, and of automatic adjustment of the circuits for regenerative braking, by throwing the master controller in the opposite direction.

I desire it to be understood that whereas, for simplicity and clearness, I have shown my invention as embodied in a simple and familiar system, the invention is readily applicable to various other types of control system, as will be evident to those versed in railway practice.

Figure 1 of the accompanying drawings is a diagrammatic view of a system of electric motor control embodying my invention, the main circuit connections and the switches and control apparatus which are directly associated therewith being shown complete, according to the usual diagrammatic methods of representation. The control circuits, however, are merely indicated by appropriately designated lines, in order to avoid confusion.

Fig. 2 is a diagrammatic view of the control circuits including the actuating coils and the interlocks which form parts of the main circuit switches and control apparatus shown in Fig. 1. In order to simplify the circuit connections, however, the interlocks which, as shown in Fig. 1, are grouped with the various switches, are distributed and each of them is marked to indicate the switch or control device with which it is associated and by which it is operated.

Fig. 3, Fig. 4 and Fig. 5 are simplified diagrammatic views respectively illustrating the motor circuits during acceleration, the machine braking circuits preliminary to connection to the supply circuit, and the machine circuits during regenerative operation.

Referring to Fig. 1 of the drawings, the system here shown comprises a supply circuit conductor which, for convenience is marked "Trolley"; a return circuit conductor which is marked "Ground"; an electric motor having an armature marked M1 and a field magnet winding marked F1; a pair of line switches marked LS1 and LS2; a plurality of resistor sections respectively adapted to be short-circuited by switches R1, and R2 and RX, the latter being the "Tirrill regulator switch" hereinbefore mentioned; a field-regulating resistance FR1 which is provided with a short-circuiting switch X1; a storage battery marked Bat. 1; switches B1 and B2 for connecting the battery in circuit; a controller for governing the field-regulating resistance, marked PK1; a plurality of limit switches A, B and C, a differential relay switch D1 and a reversing switch marked "Reverser".

In order to avoid confusion, each resistor section will hereinafter be designated by the reference character which is applied to its short-circuiting switch, for example: the resistor short-circuited by the switch RX will be termed the RX resistor.

The operation of the system, with reference to the main circuits only will first be discussed and, subsequently, the control circuits, by which the desired circuit changes are accomplished, will be traced.

Assuming that it is desired to accelerate the motor, the switches LS1, LS2 and RX are closed, thereby connecting the motor and the resistors R1 and R2 in series across the line, as illustrated in Fig. 3. The resistors are then gradually short-circuited, dependent upon the limit switch A, in accordance with familiar practice, thus impressing full voltage upon the motor.

It will be understood that whereas, for simplicity and clearness, I have shown only one motor, my invention is readily applicable to a system embodying a plurality of motors and wherein series-parallel or other types of control are employed.

In the braking position of the controller, the field magnet winding of the motor is first reversed with respect to the armature, and the switches B1 and B2 then close, followed by the actuation of the controller PK1 to its braking positions. The battery is thus connected across the motor field magnet winding and the field regulating resistance FR1, the resistance being varied by the controller to vary the armature voltage.

The line switches LS1 and LS2 are automatically dependent upon the differential relay switch D1 and, consequently, when a predetermined relation exists between the voltage generated at the terminals of the motor armature and the voltage of the line, the motor is automatically connected to the line by the closing of the line switches. The controller PK1 is thereupon automatically regulated, as hereinafter pointed out, to so govern the field-regulating resistance as to maintain a substantially constant braking current. This obviously involves the gradual exclusion of the resistance to maintain a substantially constant generated voltage at the terminals of the motor as its speed decreases.

The PK controller is intended to be representative of any suitable means for automatically governing the field-regulating resistance and I do not wish to be limited to any specific control apparatus.

The PK controller comprises a plurality of contact fingers which are connected to intermediate points in the field-regulating resistance; and suitable contact segments which are adapted to successively engage the fingers and gradually short-circuit the resistance in a well-known manner.

The controller is preferably in the form of a drum, which is shown developed into a single plane in accordance with a familiar practice, and is provided with a shaft 1 to which a pinion 2 is secured. The drum is actuated by a rack 3 which meshes with the pinion 2 and is connected at its respective ends to pistons 4 and 5 which operate in cylinders 6 and 7. Fluid pressure is admitted from a tank or reservoir 8, through an electromagnetically controlled valve 9 to the cylinder 7, when an actuating coil 10 for the valve is deënergized, and fluid pressure is admitted from the tank or reservoir to the cylinder 6 when an actuating coil 11 for the other magnet valve 12 is energized.

The arrangement of parts is such that if both magnet valves are deënergized, the fluid pressure will be admitted through the valve 9 to the cylinder 7 and will so actuate the piston 5 and the rack 3 as to throw the PK drum to its "off" position.

If magnet valve 12 is energized, fluid pressure will be admitted to the cylinder 6, but no motion of the drum will result, inasmuch as the pressures are then balanced on the two sides of the piston member. A motion of the drum may, however, be produced by subsequently energizing the coil 10 of the valve 9, since, by this means, the valve 9 will cut off the supply of pressure from the reservoir and will open its exhaust port. The drum may be stopped at any position by merely deënergizing the coil 10, and it may be returned to its off position by merely deënergizing both of the coils 10 and 11.

The valve magnet 12, which, when energized, is open to admit fluid pressure to the cylinder and, when deënergized, is closed to exhaust air from the cylinder, will hereinafter be referred to as a "standard" valve magnet; while the valve magnet 9 which is open to admit fluid pressure to the cylinder, when deënergized, and exhausts the air from the cylinder, when energized, will hereinafter be referred to as "inverted" valve magnet.

The "reverser" may be of any suitable type, but preferably comprises a drum section which is adapted to occupy two positions, one for forward and the other for reverse operation of the vehicle. It is preferably pneumatically operated, and is controlled by valves having actuating coils 13 and 14.

The limit switches A and B are opened when energized above predetermined values, and the switch C is closed when energized above a predetermind value.

The differential relay switch D1 is provided with a coil 15, which, when energized, tends to raise it, and a coil 16 which tends to hold it down.

The coil 15 is connected in shunt relation to the armature M1 when the PK drum occupies any "on" position by reason of the interlocking contact member marked "PK on" that is disposed in the circuit of the coil.

The coil 16 is similarly connected across the supply circuit during the "on" position of the PK drum by reason of the inclusion of an interlock marked "PK on" in the coil circuit.

Referring to Fig. 2 of the drawings, the control circuits here shown are governed by a master controller adapted to occupy an "off" position, an accelerating position a and a braking position b; and a master reverser adapted to occupy a forward position f and a reversing position r.

Energy may be supplied to the control circuits from any suitable source, such as a control battery SB, having a positive terminal which, together with its connected conductors, is marked B+ and a negative terminal which, with its connected conductors, is marked B—.

Assuming that the master controller is moved from its "off" position to its accelerating position, and that the master reverser and main reverser occupy their forward running positions, a circuit is established from the B+ terminal of the battery, through the master reverser, master controller, main reverser, and conductors 17, 18 and 19 to the coils of the line switches LS1 and LS2, and from the conductor 19 through an interlock marked "PK off" to the coil of the switch RX, thereby closing the switches and connecting the motor in series with the resistors R1 and R2 across the supply circuit.

A second circuit is thereupon established from the master controller, through conductor 20, interlock marked "LS1—in," contact members of the switches D1 and A, a second interlock marked "LS2—in" and then progressively, and dependent upon the limit switch A, to the coils of the switches R1 and R2, in a well-known manner. The motor is thus connected in full series position.

Assuming that the vehicle propelled by the motor is operating at or above a predetermined speed, that the master controller has been returned to its off position, permitting all the switches to open, and is moved to its braking position; under these conditions, energy is first supplied from the B+ terminal of the battery SB to energize the contact members that respectively engage control fingers 21 and 22. A circuit is thus established from the finger 21 through contact members 23 and 24 of the master reverser, conductor 25 and contact member 26 of the main reverser to the reversing coil 14, thereby throwing the reverser to the reversed position, without requiring the actuation of the master reverser. The purpose of the reversal of the series field or of the armature prior to establishing the regenerative connections is well known to those skilled in the art.

Upon actuation of the main reverser, a circuit is completed from the contact member 26, through conductors 27, 17ª, 28 and 29, contact member 30 of the master controller, conductor 31, and the coils of the switches B1 and B2. The closure of these switches establishes a circuit from the energized control finger 22, through conductor 20, interlocks marked, respectively, "B1 in" and "B2 in," contact members of the differential relay switch D1 and of the limit switch A, and interlock marked "LS2—out," to the inverted valve magnet of the controller PK1. Another connection is also made from the contact member of the switch D1, through interlocks marked, respectively, "B1 in" and "B2 in," and conductor 32, to the coil of the standard valve magnet. The battery SB is thus connected across the field magnet winding F1 of the motor and the field-regulating resistance FR1, while the PK1 controller receives a step-by-step actuation, as hereinbefore explained, to gradually short-circuit the resistance FR1, thereby raising the voltage generated at the terminals of the motor.

The coil of the switch RX is energized simultaneously with the valve magnet coils, from the conductor 20ª, through a contact member of the high-current limit switch B, the resistor RX being thus initially short circuited, as shown in Fig. 4.

The controller PK1 will continue to move step-by-step until the electro-motive force across the armature terminals reaches a predetermined value, which is in excess of the line voltage by an amount at least equal to the battery voltage, when the differential relay switch D1 will be raised. The coils of both the PK1 controller standard valve magnets are thereupon momentarily deënergized, by reason of the exclusion of the differential relay switch contact member marked "D1 down" from their common supply circuit. The controller PK1 is thus moved back toward its off position, in a manner hereinbefore explained. Moreover, provided the current traversing the armature circuit is sufficiently high, the limit switch B will be raised to deënergize the coil of the RX switch and insert the resistor RX in circuit.

The raising of the switch D1 also completes a circuit from the conductor 28, through a contact member marked "D1 up" to the coils of the line switches LS1 and LS2, which are thus closed to complete regenerative connection to the line with the resistors R1 and R2 included in circuit.

The possible opening of the RX switch and the backward movement of the PK drum reinserts a certain amount of resistance in the field circuit, just at the time when the motor is connected to the line. This is particularly important, because the direction of current in the battery is immediately changed, since it is connected in series relation to the motor armature, by the braking current. The battery voltage is, therefore, suddenly raised and the field magnet winding F1 is, consequently, very much strengthened, and tends to suddenly increase the braking current. However, the immediate circuit insertion of the resistor RX, followed by the inclusion of a predetermined amount of the field-regulating resistance FR1, serves to prevent any excessive rush of current.

Upon the closure of the line switches LS1 and LS2, two interlocks marked "LS1 in" are disposed in parallel relation to the portions of the control circuit that are adapted to be bridged by the contact members marked "D1 up" and "D1 down", respectively, and the low-current limit switch C is raised, thereby insuring the maintenance of the closure of the line switches and reënergizing the standard valve magnet coil. The inverted valve magnet coil however, is not energized at present, by reason of the opening of its circuit at the interlock marked "LS2—out".

The closure of the LS2 switch also completes a circuit, dependent upon the limit switch A, through the interlock marked "LS2—in" to the coils of the switches R1 and R2 in progression, as already explained in the case of acceleration, the resistors R1 and R2 being thus gradually excluded.

As soon as the switch R2 is closed, a circuit is established from a contact member 33 thereof, conductor 34, and interlock marked "LS2 in" to the coil of the inverted valve magnet of the controller PK1. The coil of the switch RX may also be energized, dependent only upon the position of the high-current limit switch B.

The two valve magnet coils of the controller PK1 being thus simultaneously energized, the field regulating resistance FR1 will be gradually short-circuited, dependent upon the limit switch A. Simultaneously, the resistor RX is short-circuited when the regenerated current falls below a predetermined value which permits the limit switch B to assume its lower position, and is included in the field circuit when the current rises above a second predetermined value which effects the raising of the limit switch. As hereinbefore mentioned, the switch flutters open and closed like the regulating contact members of a Tirrill regulator, and the combination of the automatically governed controller PK1 and the fluttering RX switch secures to the control system a relatively high and very satisfactory degree of maintenance of the regenerated current within desirably narrow limits. The regenerative circuits just described are shown in a simple manner in Fig. 5.

Provided the supply circuit voltage remains substantially constant, then as the speed of the vehicle decreases, the PK1 controller is gradually moved to its final position, wherein all the resistance FR1 is short-circuited. However, if the supply circuit voltage fluctuates considerably, as is usually unavoidable in trolley circuits of the class in question, then the direction of movement of the PK1 controller is governed by the relative values of the variations in voltage between the regenerated and the supply circuit voltage, as will be understood. At a predetermined relatively low speed, the low-current limit switch C drops out, thereby de-energizing the coils of the line switches LS1 and LS2, to disconnect the motor from the line, opening all other switches and causing the controller PK1 to return to its off position.

The circuit connections, the arrangement of apparatus and the general type of control system may, of course, be varied within the spirit and scope of my invention. I, therefore, desire that only such limitations shall be imposed as are indicated in the appended claims.

I claim as my invention:

1. In a control system, the combination with a supply circuit, an electric motor having an armature and a field-magnet winding, a field-regulating resistance adapted to be connected in circuit with the field magnet winding, and an auxiliary source of energy for exciting the field winding, of means for varying said resistance as the motor speed or supply circuit voltage varies, and means adapted to act in conjunction with said resistance to maintain a substantially constant armature current.

2. In a control system, the combination with a supply circuit, an electric motor having an armature and a field-magnet winding, a field-regulating resistance adapted to be connected in circuit with the field magnet winding, and an auxiliary source of energy for exciting the field winding, of means for varying said resistance as the motor speed or supply circuit voltage varies and means adapted to act in conjunction with said resistance to increase the circuit resistance when a predetermined current value is attained and to decrease the circuit resistance when a second predetermined current is attained.

3. In a control system, the combination with a supply circuit, an electric motor having an armature and a field-magnet winding, a field-regulating resistance adapted to be connected in circuit with the field magnet winding, and an auxiliary source of energy for exciting the field winding, of means for regulating said resistance as the motor speed decreases or the supply circuit voltage varies, and means adapted to act in conjunction with said resistance to increase the circuit resistance when a predetermined higher current value is attained and to decrease the circuit resistance when a predetermined lower current value is attained, whereby a regenerated current of relatively small variation from a predetermined constant value is obtained.

4. In a control system, the combination with a supply circuit, an electric motor having an armature and a field-magnet winding, a normally short-circuited field-regulating resistance, and means for separately exciting the field magnet winding, of automatic means for regulating said resistance and connecting the motor to the supply circuit when the voltage generated at the motor terminals exceeds the voltage of the supply circuit, and a resistor adapted to be inserted in circuit with said resistance when a predetermined higher current value is attained and to be excluded from circuit when a predetermined lower current value is attained.

5. In a control system, the combination with a supply circuit, a series-wound electric motor, a storage battery, a field-regulating resistance, and means for connecting the storage battery in shunt circuit relation to the field-magnet winding and the field-regulating resistance, of automatic means for connecting the motor to the supply circuit when the voltage generated at the armature terminals bears a predetermined relation to the supply circuit voltage, a resistor disposed in circuit with said resistance, a switch adapted to short-circuit said resistor under predetermined armature current conditions, and means operatively connected with the armature circuit for causing said switch to open under other predetermined armature current conditions.

6. A system of control for braking an electric motor comprising a supply circuit, an electric motor having an armature and a field magnet winding, a variable resistance, an auxiliary source of current, means for connecting the said source and said resistance in circuit with the field magnet winding, means for automatically connecting the motor to the supply circuit when the voltage generated by the motor armature attains a predetermined value, a controller for said variable resistance, means for actuating the same to increase or decrease the effective value of said resistance, means for controlling said actuating means to vary said resistance to maintain the generated armature current within predetermined limits, a resistor disposed in series with said resistance, a switch adapted to short-circuit said resistor under predetermined lower armature current conditions, an actuating coil for said switch having a gap in its circuit closed under said current conditions, and a limit switch having its actuating coil connected in the armature circuit and provided with a bridging contact member for opening the coil circuit of said first switch at said gap and thereby inserting said resistor in circuit under predetermined higher current conditions.

7. In a control system, the combination with a supply circuit, an electric motor having an armature and a field-magnet winding, a field-regulating resistance adapted to be connected in circuit with the field magnet winding, and an auxiliary source of energy for exciting the field winding, of means for varying said resistance in accordance with variations in motor speed or supply circuit voltage, and a rapidly vibrating electro-responsive device for maintaining the armature current within predetermined limits.

8. In a control system, the combination with a supply circuit, an electric motor having an armature and a field-magnet winding, a field-regulating resistance adapted to be connected in circuit with the field magnet winding, and an auxiliary source of energy for exciting the field winding, of means for varying said resistance in accordance with variations in motor speed or supply circuit voltage, a translating device disposed in circuit with said resistance, and a rapidly vibrating electro-responsive device for short-circuiting said translating device and for opening the short-circuit dependent upon a predetermined lower and a higher armature current value, respectively, whereby the variations of the armature current are maintained within relatively narrow limits.

9. In a control system, the combination with a supply circuit, an electric motor having an armature and a field-magnet winding, a field-regulating resistance adapted to be connected in circuit with the field magnet winding, and an auxiliary source of energy for exciting the field winding, of means for varying said resistance in accordance with variations in motor speed or supply circuit voltage, a resistor disposed in circuit with said resistance, a rapidly vibrating electro-responsive device adapted, under predetermined conditions, to short-circuit said resistor, an actuating coil for said device, and means responsive to relatively small increases and decreases in armature current for respectively opening and closing the circuit of said coil to correspondingly open and close the short-circuit of said resistor, whereby the variations of the armature current are maintained within relatively narrow limits.

10. In a control system, the combination with a supply circuit, an electric motor having an armature and a field-magnet winding, and a variable translating device adapted to be connected in circuit with the field winding under predetermined conditions, of means adapted to act in conjunction with said translating device to automatically maintain a substantially constant armature current.

11. In a control system, the combination with a supply circuit, a dynamo-electric machine having an armature and a field-magnet winding, and a variable translating device adapted to be connected in circuit with the field winding under predetermined conditions, of means for varying said translating device in accordance with variations in motor speed or supply-circuit voltage, and a rapidly vibrating electro-responsive device for maintaining the armature current within predetermined limits.

12. In a control system, the combination with a supply circuit, a momentum-driven dynamo-electric machine having an armature and a field-magnet winding, of means for varying the excitation of the machine in accordance with variations in machine speed, or supply-circuit voltage during the regenerative period, and automatic means adapted to act in conjunction with said first means for maintaining a substantially constant regenerated current.

In testimony whereof, I have hereunto subscribed my name this 30th day of March, 1914.

NORMAN W. STORER.

Witnesses:
B. B. HINES,
JACOB STAIR, Jr.